US012224513B2

(12) United States Patent
Kimura et al.

(10) Patent No.: US 12,224,513 B2

(45) Date of Patent: Feb. 11, 2025

(54) CONNECTOR DEVICE AND WIRE HARNESS MANUFACTURING METHOD

(71) Applicant: Yazaki Corporation, Tokyo (JP)

(72) Inventors: Syuji Kimura, Makinohara (JP); Sadaharu Okuda, Makinohara (JP); Terumitsu Sugimoto, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 393 days.

(21) Appl. No.: 17/838,506

(22) Filed: Jun. 13, 2022

(65) Prior Publication Data

US 2022/0416459 A1 Dec. 29, 2022

(30) Foreign Application Priority Data

Jun. 23, 2021 (JP) ................................ 2021-104453

(51) Int. Cl.
*H01R 13/03* (2006.01)
*H01R 13/405* (2006.01)
*H01R 43/02* (2006.01)

(52) U.S. Cl.
CPC ........... *H01R 13/03* (2013.01); *H01R 13/405* (2013.01); *H01R 43/02* (2013.01)

(58) Field of Classification Search
CPC ...... H01R 13/03; H01R 13/405; H01R 43/02; H01R 13/506; H01R 43/20; H01R 43/005; H01R 13/5216; H01R 4/625; H01R 4/70; H01R 13/40; H01R 13/533; H01R 43/00; H01R 43/18
See application file for complete search history.

(56) References Cited

U.S. PATENT DOCUMENTS

| | | | | |
|---|---|---|---|---|
| 5,925,202 A | | 7/1999 | Ide et al. | |
| 6,004,170 A | * | 12/1999 | Kato ...................... | H01R 4/021 174/84 R |
| 6,024,605 A | | 2/2000 | Beck, Jr. et al. | |
| 6,027,589 A | | 2/2000 | Kato et al. | |

(Continued)

FOREIGN PATENT DOCUMENTS

| | | |
|---|---|---|
| DE | 197 23 215 A1 | 12/1997 |
| EP | 0838883 A2 | 4/1998 |

(Continued)

*Primary Examiner* — Briggitte R. Hammond
(74) *Attorney, Agent, or Firm* — Sughrue Mion, PLLC

(57) ABSTRACT

A connector device includes a connector housing having a terminal accommodating chamber, a terminal configured to be accommodated in the terminal accommodating chamber, an electric wire configured to be connected to the terminal, a corrosion-proof material to be disposed at a position facing the terminal accommodated in the terminal accommodating chamber and a corrosion-proof target portion of the electric wire, and a corrosion-proof material support portion retaining the corrosion-proof material above the connector housing such that the corrosion-proof material can be moved toward the corrosion-proof target portion. A melting point of the corrosion-proof material is set to be lower than a melting point of a material forming the connector housing, and the corrosion-proof material is configured to be melted and then cured while covering the corrosion-proof target portion.

10 Claims, 5 Drawing Sheets

(56) References Cited

U.S. PATENT DOCUMENTS

| | | | | |
|---|---|---|---|---|
| 6,072,124 | A * | 6/2000 | Kato | H01R 43/005<br>174/72 C |
| 8,998,659 | B2 * | 4/2015 | Sato | H01R 4/70<br>439/877 |
| 2013/0303019 | A1 | 11/2013 | Ito et al. | |
| 2015/0132993 | A1 | 5/2015 | Osada et al. | |

FOREIGN PATENT DOCUMENTS

| | | | |
|---|---|---|---|
| JP | 10-321287 | A | 12/1998 |
| JP | 11-45753 | A | 2/1999 |
| JP | 11-238545 | A | 8/1999 |
| JP | 2000-260534 | A | 9/2000 |
| JP | 2004-111058 | A | 4/2004 |
| JP | 2012-164460 | A | 8/2012 |
| JP | 201426795 | A | 2/2014 |
| JP | 2014165158 | A | 9/2014 |

* cited by examiner

CONNECTOR DEVICE AND WIRE HARNESS MANUFACTURING METHOD

CROSS-REFERENCE TO RELATED APPLICATION

The present application claims priority to Japanese Patent Application No. 2021-104453 filed on Jun. 23, 2021, the entire content of which is incorporated herein by reference.

TECHNICAL FIELD

The presently disclosed subject matter relates to a connector device and a wire harness manufacturing method.

BACKGROUND

A general wire harness mounted on a vehicle and the like includes a large number of bundled and integrated electric wires and has a complicated shape. A connector for connecting a predetermined device is usually attached to end portions of the electric wires. When the wire harness is manufactured, sheathes at the end portions of the electric wires each sheathed with an insulator such as a resin are peeled off to expose core wires, and metal terminals are fixed to the end portions of electric wires. A terminal usually uses a crimping terminal, and front-end portions where the core wires of the electric wires are exposed, as well as positions where the core wires are covered, are crimped to the terminal by crimping. Then, the metal terminal crimped to the electric wires is inserted into and fixed to a predetermined cavity formed in a connector housing that is a body of a connector.

Meanwhile, when electric wires whose core wires are made of aluminum are crimped and fixed to the terminals, it is necessary to prevent corrosion from occurring at crimping positions. Therefore, in a wire harness or the like, a corrosion-proof operation is subjected to the crimping portions of the core wires by a method such as applying a predetermined corrosion-proof material.

For example, in related art, there is disclosed a technique for improving corrosion-proof performance of an electric wire connection portion between an electric wire conductor of an insulated electric wire and a terminal fitting in a sheathed electric wire equipped with a terminal and a wire harness. Specifically, the sheathed electric wire equipped with the terminal is configured such that the connection portion between the electric wire conductor of the sheathed electric wire and the terminal fitting is coated with a coating film made of a corrosion-proof agent, a bottom surface of a barrel of the terminal fitting is exposed to the outside without being coated with the corrosion-proof agent, and an electric wire side end surface of the barrel is exposed to the outside without being coated with the coating film made of the corrosion-proof agent (for example, see JP2014-165158A).

In addition, another related art discloses a technique for enabling use of a connector in related art while preventing corrosion at a connection portion between an electric wire and a crimping terminal for a long period of time in a terminal-equipped electric wire. The terminal-equipped electric wire includes a corrosion-proof material integrally formed around the connection portion between a conductor of the electric wire and the crimping terminal and around an electric wire sheathed material (for example, see JP2014-26795A).

Meanwhile, in a wire harness for a vehicle, high reliability related to conduction between an electric wire and a terminal is required. Therefore, in a manufacturing process of the wire harness, a crimped state is inspected after the crimping terminal is crimped and fixed to the electric wire. Specifically, it is inspected whether a shape of a crimped portion, a positional relationship between an exposed core wire and the crimped portion, and the like are in a state of satisfying prescribed conditions. Thereafter, when a type of the core wire of the electric wire is aluminum, a corrosion-proof material is applied to the crimped portion. Further, it is inspected whether the corrosion-proof material is applied as specified. After all the above operations are completed, the terminal connected to the electric wire is inserted into and fixed to a cavity of a connector housing.

In a manufacturing process of a wire harness, it is desired that various wire harnesses having different types and specifications can be efficiently manufactured using a common manufacturing facility. However, for example, when the core wire of the electric wire is made of copper or aluminum, it may be necessary to change the type of the terminal. Further, when the type of the core wire of the electric wire is different, presence or absence of the corrosion-proof operation and the inspection thereof is different, and thus the process becomes complicated, and it is difficult to automate the manufacturing using the common manufacturing facility.

When the wire harness is manufactured, the entire manufacturing process may be divided into, for example, a pre-process and a post-process, and the pre-process and the post-process may be performed in separate factories. In addition, a process which is not common to all the wire harnesses, such as the corrosion-proof operation and the inspection process thereof, is preferably performed in the post-process as much as possible so as to cope with a specification change of the wire harness to be manufactured. However, in a case of a manufacturing procedure in the related art, the corrosion-proof operation and the inspection thereof need to be performed in the pre-process.

The presently disclosed subject matter provides a connector device and a wire harness manufacturing method capable of making a terminal and a manufacturing facility common to different types of electric wire core wires and the like and facilitating automation of manufacturing.

According to an illustrative aspect of the presently disclosed subject matter, a connector device includes a connector housing having a terminal accommodating chamber, a terminal configured to be accommodated in the terminal accommodating chamber, an electric wire configured to be connected to the terminal, a corrosion-proof material to be disposed at a position facing the terminal accommodated in the terminal accommodating chamber and a corrosion-proof target portion of the electric wire, and a corrosion-proof material support portion retaining the corrosion-proof material above the connector housing such that the corrosion-proof material can be moved toward the corrosion-proof target portion. A melting point of the corrosion-proof material is set to be lower than a melting point of a material forming the connector housing, and the corrosion-proof material is configured to be melted and then cured while covering the corrosion-proof target portion. According to another illustrative aspect of the presently disclosed subject matter, a wire harness manufacturing method for manufacturing a wire harness including a connector housing having a terminal accommodating chamber, a terminal configured to be accommodated in the terminal accommodating chamber, and an electric wire configured to be connected to the terminal is provided. The wire harness manufacturing method includes disposing the terminal in the terminal accommodating chamber and fixing the terminal to the terminal accommodating chamber, fixing the electric wire to the terminal by physically and electrically connecting the electric wire to the terminal, bringing a corrosion-proof material close to a corrosion-proof target portion including a connection portion at which the terminal and the electric wire are connected to each other and melting and then curing the corrosion-proof material to perform a corrosion-proof operation to the corrosion-proof target portion.

Other aspects and advantages of the presently disclosed subject matter will be apparent from the following description, the drawings and the claims.

DESCRIPTION OF EMBODIMENTS

A specific embodiment according to the presently disclosed subject matter will be described below with reference to the drawings.

Figure 1:
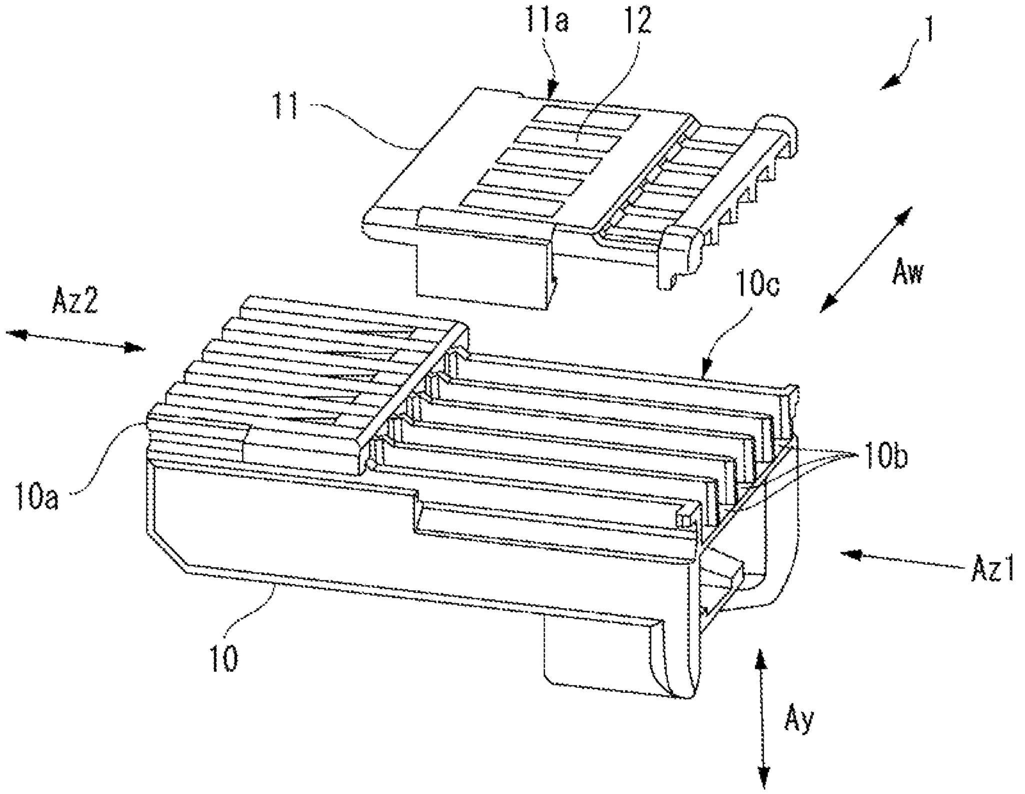
FIG. 1 is an exploded perspective view showing a connector housing and a cover thereof of a connector device according to an embodiment of the presently disclosed subject matter.

FIG. 1 is an exploded perspective view showing a connector housing and a cover thereof of a connector device 1 according to the embodiment of the presently disclosed subject matter.

As shown in FIG. 1, a connector housing 10 is a main body forming a female side of a pair of connectors to be fitted to each other. The pair of female connector and male connector can be integrated by being attached in a connector inserting and removing direction Az2 in FIG. 1. Although only the female connector will be described in the following description, the male connector can be configured in the same manner as the female connector.

The connector housing 10 shown in FIG. 1 is configured such that electric circuits can be connected at five connection points arranged in a row in a connector width direction Aw. Specifically, elongated spaces running in the connector inserting and removing direction Az2 from a connector front end portion 10*a* to a rear end portion on an opposite side thereof are formed as cavities (terminal accommodating chamber) 10*b*. A cross-sectional shape of each cavity 10*b* is, for example, a rectangular shape or a circular shape.

In the example of FIG. 1, the five cavities 10*b* are arranged in a row in the connector width direction Aw. The five cavities 10*b* form spaces independent of each other, and are used as, for example, five spaces each for disposing a metal terminal 13 and a sheathed electric wire 14 shown in FIGS. 2A and 2B.

As shown in FIG. 1, in the present embodiment, an upper opening portion 10*c* is formed in an upper portion of the connector housing 10. The upper opening portion 10*c* allows upper portions of the five cavities 10*b* to be exposed to the outside of the connector housing 10. The upper opening portion 10*c* is used for a welding operation and a corrosion-proof operation, which will be described later.

In addition, the connector device 1 includes a cover 11 that can be fitted to the connector housing 10. The cover 11 has a shape matching the upper opening portion 10*c* of the connector housing 10. Therefore, by fitting the cover 11 to the upper opening portion 10*c* from above as shown in FIG. 1, the cover 11 can be fixed in a state of covering the entire upper opening portion 10*c* and all the plurality of cavities 10*b*.

The cover 11 holds a corrosion-proof material 12 in a corrosion-proof material holding portion 11*a* in advance. The corrosion-proof material holding portion 11*a* holds the corrosion-proof material 12 in a manner in which when a force is applied to the corrosion-proof material 12 from above, the corrosion-proof material 12 can move downward with respect to the cover 11.

The corrosion-proof material 12 is held at a position corresponding to each position of the five cavities 10*b* facing the cover 11. The corrosion-proof material 12 is solid at a room temperature, melts at a temperature equal to or higher than a predetermined melting point, and is cured when the temperature gets low enough again. The melting point of the corrosion-proof material 12 is set to be sufficiently lower than that of the connector housing 10.

Figure 2A:
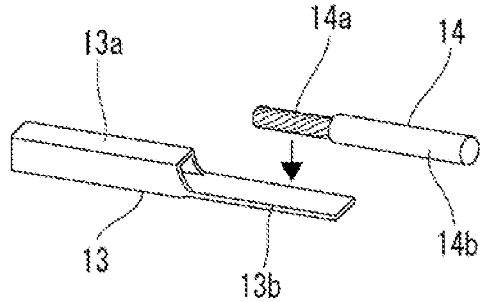
FIG. 2A and FIG. 2B are perspective views showing a metal terminal and a sheathed electric wire before and after attachment, respectively.
Figure 2B:
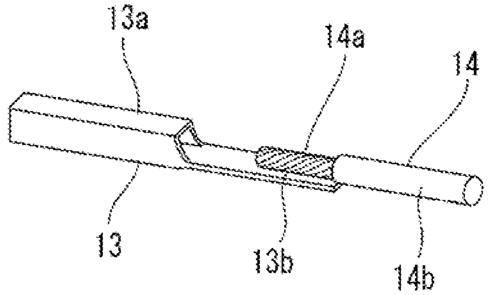

FIG. 2A and FIG. 2B are perspective views showing the metal terminal and the sheathed electric wire before and after attachment, respectively. In FIG. 2A and FIG. 2B, only a front-end portion of the sheathed electric wire 14 is shown.

As shown in FIG. 2A and FIG. 2B, the metal terminal 13 includes a fitting portion 13*a* and an electric wire coupling portion 13*b*. The fitting portion 13*a* is in a region on a front side of the metal terminal 13, and has a shape that can be fitted to a pin-shaped male terminal in the male connector.

The electric wire coupling portion 13*b* of the metal terminal 13 is a metal plate having a flat plate shape or a curved surface shape that is capable of coming into contact with a front-end region of the sheathed electric wire 14, and is in a region on a rear side of the metal terminal 13 as shown in FIG. 2A and FIG. 2B.

The sheathed electric wire 14 includes an electric wire core wire 14*a* and an insulating sheath 14*b* made of resin or the like that covers the electric wire core wire 14*a*. When the sheathed electric wire 14 is to be attached to the metal terminal 13, the insulating sheath 14*b* at a front-end portion of the sheathed electric wire 14 is peeled off, and the electric wire core wire 14*a* is exposed as shown in FIG. 2A and FIG. 2B.

Then, as shown in FIG. 2A and FIG. 2B, the entirety of the exposed part of the electric wire core wire 14*a* and a portion of a front end of the insulating sheath 14*b* align with the electric wire coupling portion 13*b* so as to overlap the electric wire coupling portion 13*b*. In this state, a predetermined laser welding machine is used to irradiate the electric wire core wire 14*a* with a laser beam via the upper opening portion 10*c*, thereby welding the electric wire core wire 14*a* to the electric wire coupling portion 13*b*.

In the present embodiment, the metal terminals 13 are disposed in advance at positions corresponding to the respective cavities 10*b* of the connector housing 10. Therefore, in a state where the upper opening portion 10*c* is opened as shown in FIG. 1, the sheathed electric wires 14 are moved in an electric wire inserting direction Az1 to be inserted into the respective cavities 10*b* from a rear end side of the connector housing 10. After the electric wire core wire 14*a* and the electric wire front end portion having the sheath are aligned with a position of the electric wire coupling portion 13*b* of the corresponding metal terminal 13 so as to overlap the position of the electric wire coupling portion 13*b* of the corresponding metal terminal 13, the laser welding is performed.

For example, when a laser welding machine equipped with a galvano scanner is used, it is easy to perform the welding by sequentially positioning a laser beam at each of the electric wire coupling portions 13*b* of the plurality of metal terminals 13 accommodated in the cavities 10*b* of the connector housing 10.

In a case where a crimping terminal is used instead of the metal terminal 13 as in a general connector, since a crimping operation cannot be performed or is difficult to be performed inside the connector housing, it is necessary to crimp an electric wire to the crimping terminal and then insert the electric wire into the cavity of the connector housing.

In contrast, in the present embodiment, since it is assumed that the metal terminals 13 and the sheathed electric wires 14 are fixed by the laser welding using the upper opening portion 10*c*, the metal terminals 13 can be mounted in the connector housing 10 in advance, and the sheathed electric wires 14 can be inserted into the cavities 10*b* and welded later.

Figure 3:
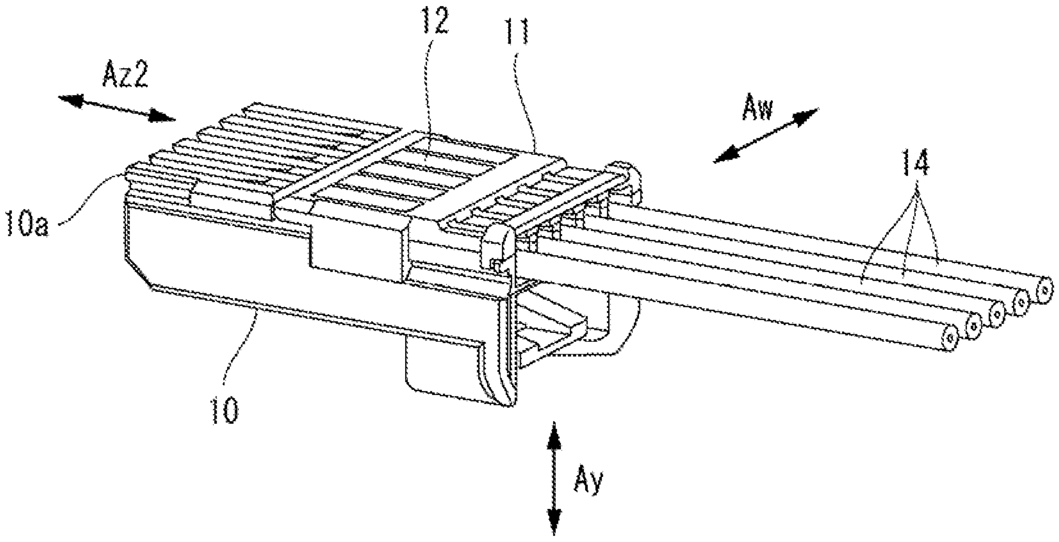
FIG. 3 is a perspective view showing outer appearance of the connector housing in a state in which the sheathed electric wires and the cover are attached to each other.

FIG. 3 is a perspective view showing outer appearance of the connector housing in a state in which the sheathed electric wires and the cover are attached.

When the sheathed electric wires 14 are respectively inserted into the five cavities 10*b* of the connector housing 10, the electric wire coupling portions 13*b* and the electric wire core wires 14*a* in the respective cavities 10*b* are subjected to the laser welding, and the cover 11 is attached to the connector housing 10 and the upper opening portion 10*c* is closed, the connector device 1 is brought into a state shown in FIG. 3. In addition, after the assembly in the state of FIG. 3, the corrosion-proof operation to be described later is performed as necessary.

When a material of the electric wire core wire 14*a* of the sheathed electric wire 14 connected to the metal terminal 13 is aluminum, the corrosion-proof operation is required to prevent corrosion of a connection portion. In addition, the corrosion-proof operation needs to be performed after the laser welding of the connection portion between the electric wire coupling portion 13*b* and the electric wire core wire 14*a* is completed.

When the material of the electric wire core wire 14*a* is copper, the corrosion-proof operation can be omitted. In addition, when a plurality of sheathed electric wires 14 having different types of electric wires are connected to one connector in a mixed state, the corrosion-proof operation may be selectively performed only on the sheathed electric wire 14 in which the material of the electric wire core wire 14*a* is aluminum.

In addition, in the present embodiment, the metal terminal 13 is formed of a material that can be commonly used for connection with both the sheathed electric wires 14 respectively made of aluminum and copper so as to be compatible with both the sheathed electric wires 14 respectively made of aluminum and copper in a common manufacturing process.

Figure 4A:
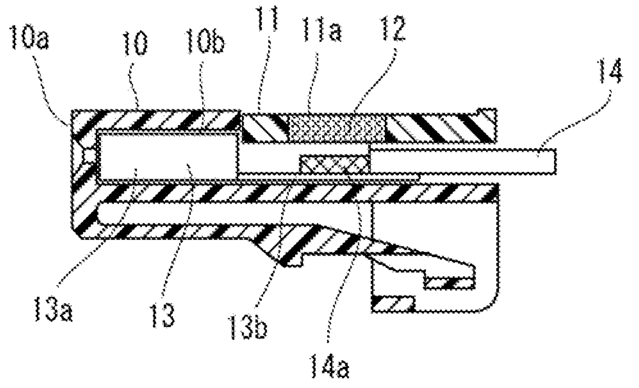
FIGS. 4A, 4B, and 4C are longitudinal sectional views showing different states of a portion made of a corrosion-proof material in a manufacturing process.
Figure 4B:
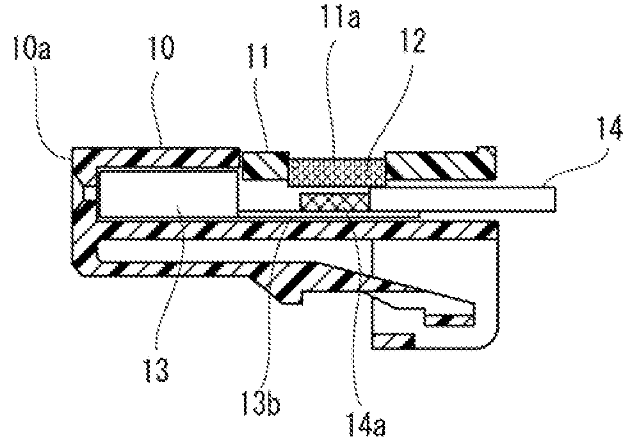
Figure 4C:
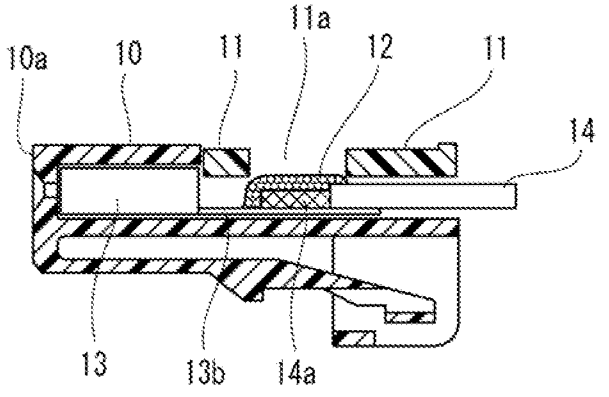

FIGS. 4A, 48, and 4C are longitudinal sectional views showing different states of a portion made of the corrosion-proof material in the manufacturing process. In the state shown in FIGS. 3 and 4A, the electric wire coupling portion 13*b* of the metal terminal 13 disposed in the cavity 10*b* and the electric wire core wire 14*a* are fixed to each other by the laser welding. In addition, the corrosion-proof material 12 is disposed in the corrosion-proof material holding portion 11*a* of the cover 1 at a position directly above each position to be welded in a state of facing each portion to be welded.

In the state shown in FIG. 4A, when a force is applied from the outside to a position of the corrosion-proof material holding portion 11*a* so as to push the corrosion-proof material 12 downward from above, the state shown in FIG. 4B is obtained. That is, the corrosion-proof material 12 held on the cover 11 comes close to or comes into contact with the electric wire core wire 14*a* and the front end of the insulating sheath 14*b* for each cavity 10*b*.

In the state shown in FIG. 4B, heat is applied to the corrosion-proof material 12 at each position to heat the corrosion-proof material 12 to a temperature equal to or higher than the melting point of the corrosion-proof material 12. For example, the corrosion-proof material 12 is heated by irradiating the corrosion-proof material 12 with a laser beam while reducing an output of the laser welding machine.

When the corrosion-proof material 12 is melted by being heated, as shown in FIG. 4C, the corrosion-proof material 12 is melted and falls, and a shape thereof changes so as to cover an outer side of each electric wire core wire 14*a* and the front-end portion of the insulating sheath 14*b*. Then, when the temperature is lowered after the heating is finished, the corrosion-proof material 12 is cured in this shape. As a result, the sheath of the corrosion-proof material 12 is formed and protects the electric wire core wire 14*a* and a vicinity of a welded portion, so that corrosion is prevented. In addition, since the melting point of the corrosion-proof material 12 is sufficiently lower than that of the connector housing 10, it is possible to prevent deformation of the connector housing 10 when the corrosion-proof material 12 is heated.

Figure 5:
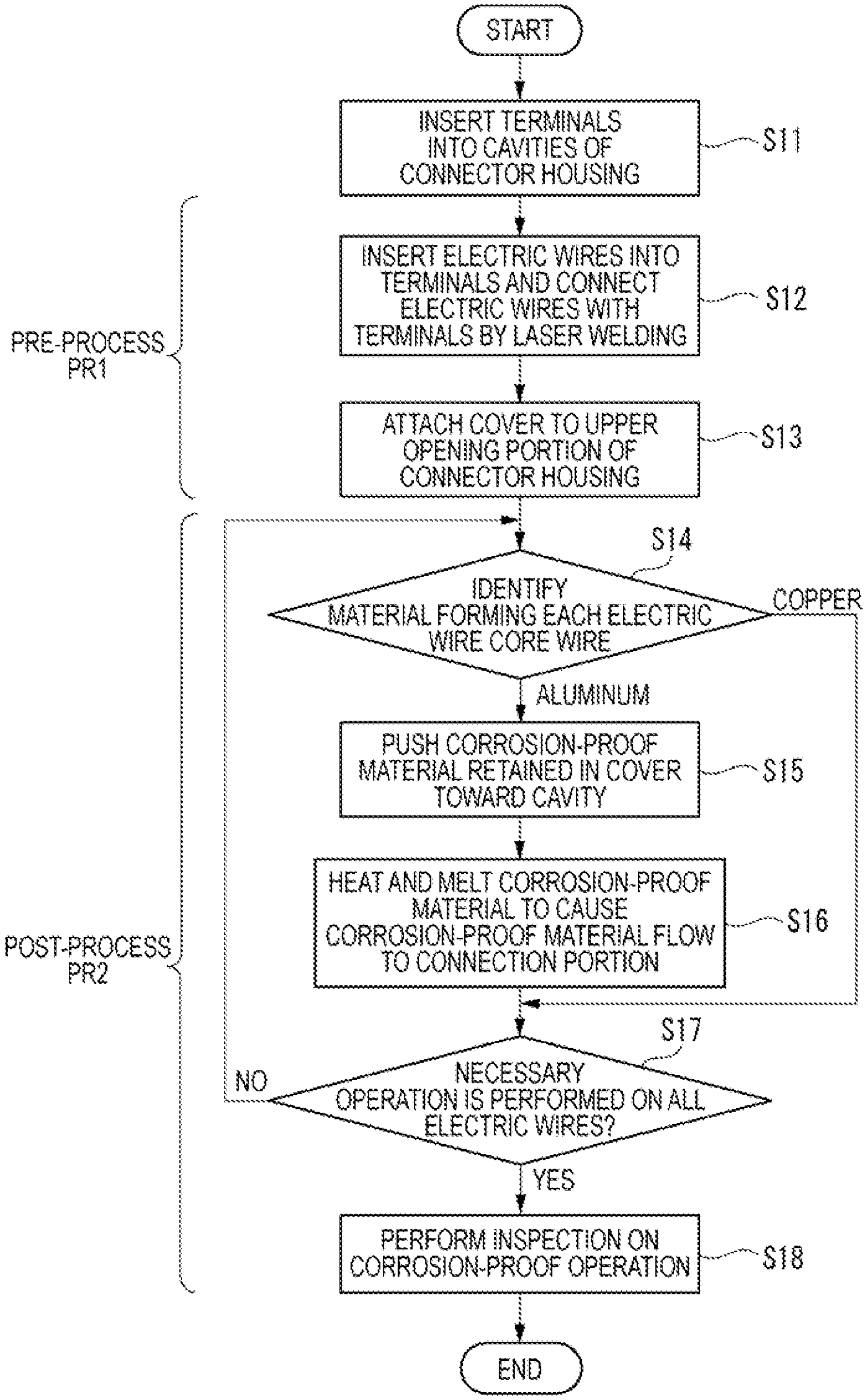
FIG. 5 is a flowchart showing an example of a processing procedure in the manufacturing process of the connector device.

FIG. 5 is a flowchart showing an example of a processing procedure in the manufacturing process of the connector device 1. This processing procedure can be performed manually by an operator, or can be performed using an automated assembling apparatus or inspection apparatus. The processing procedure of FIG. 5 will be described below.

First, in step S11, all the metal terminals 13 to be attached to the connector are incorporated into the respective cavities 10*b* in the connector housing 10. When the connector housing 10 to which the metal terminals 13 are attached in advance can be used as a component, this step is unnecessary.

Next, the sheathed electric wire 14 in which the insulating sheath 14*b* is peeled off so that the electric wire core wire 14*a* at the front end portion is exposed is prepared in advance, and the sheathed electric wire 14 is inserted into a portion of each cavity 10*b* of the connector housing 10 from the electric wire inserting direction Az1. Then, the electric wire coupling portion 13*b* of the metal terminal 13 and the electric wire core wire 14*a* in each cavity 10*b* are aligned to be overlapped with each other, and a portion to be joint is irradiated with a laser beam from the upper opening portion 10*c* to be subjected to the laser welding and fixed (S12).

Next, the cover 11 is attached to the upper opening portion 10*c* of the connector housing 10 (S13). As a result, the state shown in FIG. 3 is obtained, and the upper opening portion 10*c* is closed. In addition, the cover 11 and the corrosion-proof material 12 are disposed on the connector housing 10. A position where the corrosion-proof material 12 is disposed is a position directly above and facing the electric wire coupling portion 13*b* of each metal terminal 13 and the electric wire core wire 14*a* of the sheathed electric wire 14 in the connector housing 10.

Next, the materials of the electric wire core wires of the sheathed electric wires 14 mounted at respective cavity positions of the connector housing 10 are identified (S14). For example, the core wire material of the sheathed electric wire 14 at each cavity position for each connector can be identified based on information indicating a manufacturing specification of a wire harness to be manufactured. When the material is aluminum, the procedure proceeds from S14 to S15, and when the material is copper, the procedure proceeds to S18.

Next, in S15, a force is applied from above the corrosion-proof material holding portion 11*a* in the cover 11 in an upper portion of the corresponding cavity 10*b*, and the corrosion-proof material 12 is pushed into the cavity 10*b* that needs to be subjected to the corrosion-proof operation as shown in FIG. 4B.

Next, the corrosion-proof material 12 pushed into each cavity 10*b* is heated for, for example, a certain period of time to melt the corrosion-proof material 12 (S16). As a result, the melted corrosion-proof material 12 flows down to form a sheath so as to sheath a surface of the electric wire core wire 14*a* and the like of the connection portion for each cavity 10*b* as shown in FIG. 4C, and is cured when the temperature decreases.

The processes of S14 to S17 are performed on all the sheathed electric wires 14 connected to the same connector housing 10. When the processes performed on all the sheathed electric wires 14 are completed, the procedure proceeds from S17 to S18, and inspection of a portion subjected to the corrosion-proof operation is performed. For example, an operator performs visual inspection on the corrosion-proof material holding portion 11*a*, and inspects whether the sheath of the corrosion-proof material 12 is formed in a predetermined state at a portion where the corrosion-proof operation is necessary.

Incidentally, the processing procedure shown in FIG. 5 can be divided into a pre-process PR1 including S12 and S13 and a post-process PR2 including S14 to S18 to manage the manufacture. For example, the pre-process PR1 and the post-process PR2 can be efficiently performed in accordance with a production schedule of a vehicle at different times by using factories, facilities, personnel, and the like existing in a plurality of places different from each other.

On the other hand, in a case where the metal terminals 13 and the sheathed electric wires 14 are connected to each other before the metal terminals 13 are inserted into the connector housing 10 as in a general manufacturing process, it is necessary to perform the corrosion-proof operation and the inspection thereof in accordance with the type of the electric wire earlier during the pre-process PR1, and thus a degree of freedom in changing a process of manufacturing the wire harness is reduced. That is, by manufacturing the connector device 1 having the configuration shown in FIGS. 1 to 4C by the procedure shown in FIG. 5, it is possible to efficiently produce the wire harness.

In the connector device 1 described above, since the corrosion-proof material 12 is held by the corrosion-proof material holding portion 11*a* of the cover 11 in advance, the connector housing 10, the cover 11, and the metal terminals 13 can be used as a common component regardless of whether the core wire material of the sheathed electric wire 14 to be attached to the connector is aluminum or copper. In addition, when the material of the sheathed electric wire 14 is aluminum, it is not necessary to separately prepare the corrosion-proof material as a special component.

In addition, since the processing of the laser welding and the corrosion-proof operation can be performed by using the portion of the upper opening portion 10*c* formed in the connector housing 10, the connection between the metal terminals 13 and the sheathed electric wires 14 and the corrosion-proof manufacturing process can be performed in a state where the metal terminals 13 are disposed in the cavities 10*b* of the connector housing 10. Therefore, automation of the manufacturing process is facilitated. In addition, the processing of the corrosion-proof operation can be performed in the post-process PR2.

According to an aspect of the embodiments described above, a connector device (1) includes a connector housing (10) having a terminal accommodating chamber (for example, cavity 10*b*, a terminal (for example, metal terminal 13) configured to be accommodated in the terminal accommodating chamber (10*b*), an electric wire (for example, sheathed electric wire 14) configured to be connected to the terminal, a corrosion-proof material (for example, corrosion-proof material 12) to be disposed at a position facing the terminal accommodated in the terminal accommodating chamber and a corrosion-proof target portion of the electric wire, and a corrosion-proof material support portion (for example, corrosion-proof material holding portion 11*a*) retaining the corrosion-proof material above the connector housing such that the corrosion-proof material can be moved toward the corrosion-proof target portion. A melting point of the corrosion-proof material is set to be lower than a melting point of a material forming the connector housing, and the corrosion-proof material is configured to be melted and then cured while covering the corrosion-proof target portion.

According to the connector device having the above-described configuration, the corrosion-proof material is retained on the connector housing via the corrosion-proof material support portion. Therefore, after the terminal and the electric wire are accommodated in the terminal accommodating chamber inside the connector housing, the corrosion-proof operation can be performed by melting the corrosion-proof material as a post-process. In addition, since the corrosion-proof material support portion supports the corrosion-proof material in advance in the state in which the corrosion-proof material can be moved in the direction approaching the corrosion-proof target portion, it is not necessary to separately prepare the corrosion-proof material when the corrosion-proof operation is necessary. In addition, when the corrosion-proof operation is unnecessary, the corrosion-proof material does not affect a connection portion between the terminal and the electric wire. Therefore, even when a type of a core wire of the electric wire to be attached is aluminum or copper, a common component can be used as the corrosion-proof material support portion. In addition, since the melting point of the corrosion-proof material is set to be lower than the melting point of the material of the connector housing, the corrosion-proof operation can be performed only by heating the corrosion-proof material to melt the corrosion-proof material and to form a sheath without greatly affecting the connector housing.

The corrosion-proof material may be melted after the corrosion-proof material moves to a position close to the corrosion-proof target portion while being retained by the corrosion-proof material support portion.

With this configuration, since the corrosion-proof material is melted in a state of being close to the corrosion-proof target portion, the corrosion-proof target portion can be reliably covered.

The connector device may further include a cover member (for example, cover 11) configured to be engaged with the connector housing (10) and to cover an opening (for example, upper opening portion 10*c*) of the connector housing (10), the opening being formed at a position corresponding to the terminal accommodating chamber (10_b_). The opening (10_c_) and the cover member (11) may be disposed at positions facing the corrosion-proof target portion. The corrosion-proof material support portion (11_a_) may be provided in the cover member (11).

With this configuration, before the cover member is attached, a portion of the terminal accommodating chamber of the connector housing is exposed to the outside via the opening portion. Therefore, for example, when a laser welding machine is used, the material inside the terminal accommodating chamber can be welded from the outside of the connector housing via the opening portion. That is, after the terminal and the electric wire are accommodated in the terminal accommodating chamber inside the connector housing, an operation for joining the terminal and the electric wire can be performed. In addition, by attaching the cover member to the connector housing, it is easy to close the opening portion and protect a joint portion of the terminal and the electric wire in the terminal accommodating chamber.

The opening may be formed at a position facing the corrosion-proof target portion in a direction orthogonal to a longitudinal direction (for example, electric wire inserting direction Az1) of the terminal and the electric wire.

With this configuration, since the opening portion is formed at the position where a component of the corrosion-proof target portion is easily processed, an operation of processing the internal component from the outside of the connector housing, that is, an operation such as the welding becomes easy.

The terminal accommodating chamber (10_b_) may be a plurality of terminal accommodating chambers. The opening of the connector housing may be formed over the plurality of terminal accommodating chambers, and the cover member may cover an entirety of the plurality of terminal accommodating chambers.

With this configuration, even when the number of terminals and electric wires to be accommodated in the connector housing is large, it is possible to cover the entire opening portion only by preparing one cover member, and it is possible to avoid an increase in the number of components of the connector and an increase in the number of operation steps when assembling the components.

According to another aspect of the embodiments described above, a wire harness manufacturing method for manufacturing a wire harness including a connector housing (10) having a terminal accommodating chamber, a terminal (for example, metal terminal 13) configured to be accommodated in the terminal accommodating chamber, and an electric wire (for example, sheathed electric wire 14) configured to be connected to the terminal is provided. The wire harness manufacturing method includes disposing the terminal in the terminal accommodating chamber and fixing the terminal to the terminal accommodating chamber (S11), fixing the electric wire to the terminal by physically and electrically connecting the electric wire to the terminal (S12), bringing a corrosion-proof material close to a corrosion-proof target portion including a connection portion at which the terminal and the electric wire are connected to each other (S15) and melting and then curing the corrosion-proof material to perform a corrosion-proof operation to the corrosion-proof target portion (S16).

With this configuration, in a case where it is necessary to perform the corrosion-proof operation on the connection portion between the terminal and the electric wire, the corrosion-proof operation can be performed in a post-process. That is, since it is not necessary to perform the corrosion-proof operation before inserting the electric wire into the connector housing, an order of the manufacturing processes can be easily optimized as necessary. Therefore, for example, in a case where the manufacturing process of the wire harness is divided into a pre-process and the post-process, and manufacturing of the pre-process and manufacturing of the post-process are performed in different factories, it is possible to optimize allocation of manufacturing facilities installed for each factory and functions.

What is claimed is:

1. A connector device comprising:
- a connector housing having a terminal accommodating chamber;
- a terminal configured to be accommodated in the terminal accommodating chamber;
- an electric wire configured to be connected to the terminal;
- a corrosion-proof material to be disposed at a position facing the terminal accommodated in the terminal accommodating chamber and a corrosion-proof target portion of the electric wire; and
- a corrosion-proof material support portion retaining the corrosion-proof material above the connector housing such that the corrosion-proof material can be moved toward the corrosion-proof target portion,
- wherein a melting point of the corrosion-proof material is set to be lower than a melting point of a material forming the connector housing, and the corrosion-proof material is configured to be melted and then cured while covering the corrosion-proof target portion.

2. The connector device according to claim 1,
- wherein the corrosion-proof material is melted after the corrosion-proof material moves to a position close to the corrosion-proof target portion while being retained by the corrosion-proof material support portion.

3. The connector device according to claim 1, further comprising:
- a cover member configured to be engaged with the connector housing and to cover an opening of the connector housing, the opening being formed at a position corresponding to the terminal accommodating chamber,
- wherein the opening and the cover member are disposed at positions facing the corrosion-proof target portion, and
- wherein the corrosion-proof material support portion is provided in the cover member.

4. The connector device according to claim 3,
- wherein the opening is formed at a position facing the corrosion-proof target portion in a direction orthogonal to a longitudinal direction of the terminal and the electric wire.

5. The connector device according to claim 3,
- wherein the terminal accommodating chamber is a plurality of terminal accommodating chambers,
- wherein the opening of the connector housing is formed over the plurality of terminal accommodating chambers, and
- wherein the cover member covers an entirety of the plurality of terminal accommodating chambers.

6. A wire harness manufacturing method for manufacturing a wire harness including a connector housing having a terminal accommodating chamber, a terminal configured to be accommodated in the terminal accommodating chamber, and an electric wire configured to be connected to the terminal, the wire harness manufacturing method including:

disposing the terminal in the terminal accommodating chamber and fixing the terminal to the terminal accommodating chamber;

fixing the electric wire to the terminal by physically and electrically connecting the electric wire to the terminal;

bringing a corrosion-proof material close to a corrosion-proof target portion including a connection portion at which the terminal and the electric wire are connected to each other; and melting and then curing the corrosion-proof material to perform a corrosion-proof operation to the corrosion-proof target portion, wherein the melting the corrosion-proof material comprises heating the corrosion-proof material at a temperature that is higher than a melting point of the corrosion-proof material and is lower than a melting point of a material forming the housing.

7. The method of claim 6, wherein the melting comprises performing a welding operation on the corrosion-proof material.

8. The connector device according to claim 1, wherein the corrosion-proof material support portion retains the corrosion-proof material above the connector housing such that a first side of the corrosion-proof material faces the terminal accommodating chamber and a second side opposite to the first side is exposed to an outside of the connector housing.

9. The connector device according to claim 1, wherein the electric wire includes a core wire and an insulating sheath, the insulating sheath at an end portion of the electric wire is peeled off to expose the core wire, wherein the electric wire is configured to be connected to the terminal at the exposed portion of the core wire, and the corrosion-proof target portion of the electric wire includes a connection portion at which the terminal and the core wire are connected to each other.

10. The method of claim 6, wherein the electric wire includes a core wire and an insulating sheath, the insulating sheath at an end portion of the electric wire is peeled off to expose the core wire, wherein the electric wire is configured to be connected to the terminal at the exposed portion of the core wire, and the corrosion-proof target portion of the electric wire includes a connection portion at which the terminal and the core wire are connected to each other.

* * * * *